United States Patent
Alexander

(10) Patent No.: US 6,370,719 B1
(45) Date of Patent: Apr. 16, 2002

(54) DOCK LEVELER LIP CONSTRUCTION

(75) Inventor: James C. Alexander, London (CA)

(73) Assignee: United Dominion Industries, Inc., Charlotte, NC (US)

( * ) Notice: Subject to any disclaimer, the term of this patent is extended or adjusted under 35 U.S.C. 154(b) by 0 days.

(21) Appl. No.: 09/637,938

(22) Filed: Aug. 14, 2000

(51) Int. Cl.$^7$ ............................................. E01D 1/00
(52) U.S. Cl. ............................................................ 14/71.1
(58) Field of Search ............................ 14/69.5, 71.1, 14/71.3, 71.5, 71.7

(56) References Cited

U.S. PATENT DOCUMENTS

| | | | |
|---|---|---|---|
| 4,068,338 A | | 1/1978 | Artzberger |
| 4,091,488 A | * | 5/1978 | Artzberger .................. 14/71.7 |
| 4,195,372 A | * | 4/1980 | Farina ........................... 4/234 |
| 4,343,058 A | * | 8/1982 | Loblick ....................... 14/71.7 |
| 4,450,598 A | * | 5/1984 | Larsen ........................ 14/71.1 |
| 4,619,008 A | * | 10/1986 | Kovach et al. .............. 14/71.7 |
| 5,071,306 A | | 12/1991 | Alexander |
| 5,123,135 A | * | 6/1992 | Cook et al. .................. 14/71.3 |
| 5,287,579 A | * | 2/1994 | Estevez, Jr. ................. 14/71.1 |
| 5,311,628 A | * | 5/1994 | Springer et al. ............. 14/71.1 |
| 5,440,772 A | * | 8/1995 | Springer et al. ............. 14/69.5 |
| 5,553,343 A | * | 9/1996 | Alexander ................... 14/71.1 |
| 5,657,502 A | * | 8/1997 | Ellis ............................ 14/71.1 |
| 5,781,953 A | * | 7/1998 | Winter ........................ 14/69.5 |
| 5,813,072 A | * | 9/1998 | Alexander ................... 14/71.1 |
| 5,832,554 A | * | 11/1998 | Alexander ................... 14/71.1 |
| 5,926,890 A | * | 7/1999 | Alexander ................... 14/71.1 |
| 6,035,475 A | * | 3/2000 | Alexander ................... 14/71.1 |

* cited by examiner

Primary Examiner—Thomas B. Will
Assistant Examiner—Alexandra K Pechhold
(74) Attorney, Agent, or Firm—Baker & Hostetler LLP

(57) ABSTRACT

A lip assembly for a dock leveler comprises a substantially flat plate forming a lip, and an integral hinge extending for substantially the width of the lip. The integral hinge in a first embodiment is formed by shaping a plate into an arcuate configuration. The integral hinge has a series of slots to engage the hinge lugs and the hinge is welded to said lip along two edges thereof. In a second preferred embodiment the lip assembly for a dock leveler comprises a substantially flat plate forming a lip, a series of hinge lugs attached to on surface of the plate in a spaced arrangement, and an integral gusset extends for substantially the width of the lip. The integral gusset is coupled to each hinge lug and is welded to the lip along a continuous edge thereof.

6 Claims, 4 Drawing Sheets

DOCK LEVELER LIP CONSTRUCTION

BACKGROUND OF THE INVENTION

1. Field of the Invention

This invention relates to loading dock equipment and in particular to dock levelers which are used to span the distance between a loading dock and the bed of a vehicle. Specifically, it deals with increasing the strength and resistance to fatigue failure of the lip assembly, and with reducing the number of components and thus decreasing manufacturing complexity.

2. Prior Art

A conventional dock leveler has a deck assembly which stores level with the dock floor or vertically, and a pivoting lip assembly which extends outward to rest on the vehicle which is being loaded. The deck assembly can be of various structural configurations with structural beam members used to provide strength and rigidity to the top plate. However the lip assembly must be of a much thinner section to minimize the height difference between the top of the deck assembly and the bed of the transport vehicle. Also, the lip must hinge downward approximately 90 degrees to store the dock leveler or to allow the lip to be removed from the vehicle for end loading the last pallets at the end of the vehicle. These constraints have traditionally caused the lip assembly and hinge to be the weakest parts of the dock leveler structure. Increasing the thickness of the hinge tubes and the lip plate will increase the strength but at a significant weight and cost penalty. Also, gusset plates welded between the hinge tubes and the lip plate have been used to increase the strength. U.S. Pat. No. 5,071,306 shows an improved hinge construction with a continuous weld between the gusset and the lip plate to improve resistance to fatigue failure of the lip.

One limitation of the hinge tube construction is that the distance from the hinge pin to the lip is determined by the diameter of the tube. If the distance can be increased, then the load on the hinge pin will be reduced while providing the same resistance to rotation of the lip. The construction shown in U.S. Pat. No. 4,068,338 uses a series of plates or "lugs" attached to the deck and the lip plate. Thus the position of the hole in the hinge lug rather than the thickness of the hinge tube determines the location of the hinge pin. Although the strength of the hinge can be increased using the lug design, the lip is still prone to fatigue failure at the tip of the lug welded to the lip plate.

SUMMARY OF THE INVENTION

This invention is a new type of lip assembly and method of construction that significantly increases the strength and resistance to fatigue failure of the lip assembly of a dock leveler. In accordance with this invention a dock leveler has a frame, a deck hingedly mounted at one end to the frame and a lip hingedly mounted to the deck at another thereof. In the first preferred embodiment, the lip has a hinge that is formed from a flat plate that is bent to form a hinge pivot at the desired distance from the lip plate. The forward edge of the hinge forms a continuous gusset affixed to the lip plate. The rear edge of hinge has a plurality of segments that are affixed to the lip plate. The hinge is preferably formed from a single piece, but may be constructed of several segments joined together. Slotted openings are cut in the rear edge of the hinge. Hinge lugs are welded to the front of the deck and fit into the slotted openings of the lip hinge. A hinge pin is passed through the lip hinge and the lugs to secure the lip to the deck.

The lugs on the deck and the single piece lip hinge provide a number of structural and manufacturing advantages. The continuous gusset formed by the front edge of the hinge provides the greatest resistance to fatigue failure at the attachment to the lip. Compared to the conventional hinge tube construction where each alternating segment is attached to the lip and the segments in between coupled to the deck, the formed lip hinge provides twice as many hinge segments transferring load from the lip to the hinge pin. The hinge segments fitted between the lugs provide the hinge pin with twice as many shear joints as the prior art lug hinge, significantly reducing the stress at each joint. Both features significantly decrease the stress and improve the fatigue strength of the lip hinge. The single piece hinge also improves manufacture by eliminating the number of parts and manufacturing operations.

A second preferred embodiment has hinge lugs on both the lip and the deck and gussets welded to the lip plate and the lip lugs to form a continuous weld across the lip plate. Although this preferred embodiment does not provide the improvements in strength of the lip hinge, it does provide the improved resistance to fatigue failure at the junction of the hinge lugs to the lip plate.

This invention will be described in greater detail by reference to the drawings and the description of the preferred embodiments, which follows.

DESCRIPTION OF PREFERRED EMBODIMENTS

Figure 1:
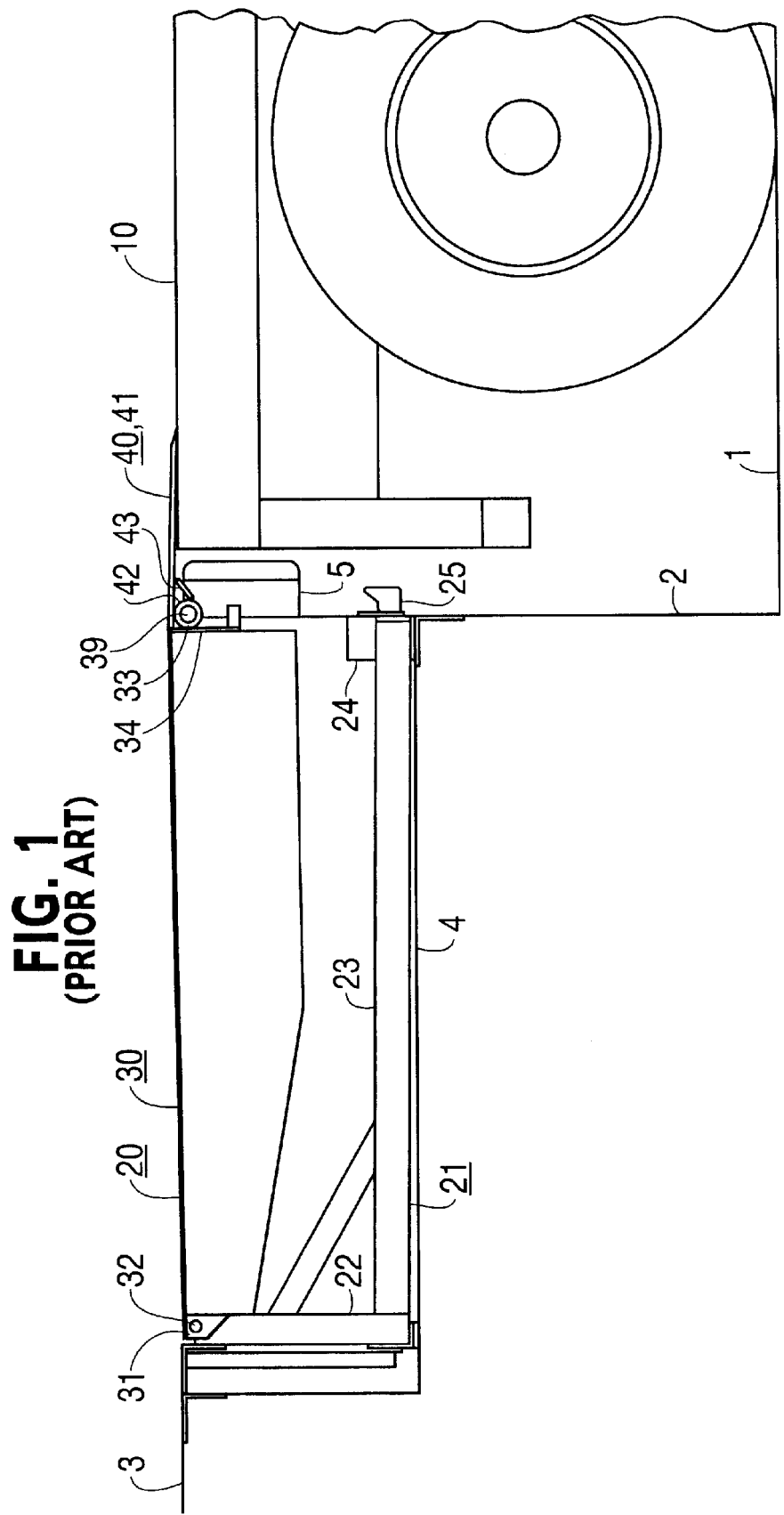
FIG. 1 is a side view of a typical dock leveler with the lip extended on to a vehicle.

Referring now to FIG. 1, a side view of a typical loading dock is illustrated. The dock has a driveway surface 1, a dock face 2 and a dock floor 3. A pit 4 is formed in the dock floor. Dock bumpers 5 limit the position of the transport vehicle 10. A dock leveler 20 has a frame assembly 21 attached to the pit. The frame assembly has vertical back frame members 22 with the hinge pivot holes near the top. Horizontal frame members 23 extend forward to the front of the pit 4 and have ramp stops 24 to limit downward deck travel for below dock operations and lip keepers 25 which support the dock leveler in the stored position. A deck assembly 30 has rear hinge supports 31 which are attached to the frame assembly 21 by a deck hinge pin 32.

Lip hinge tubes 33 are fastened to the front bar 34 of the deck assembly 30. A lip assembly 40 has a lip plate 41, hinge tubes 42 and hinge tube gussets 43, and is connected to the deck hinge tubes by a lip hinge pin 39. The front end of the lip assembly 40 rests on the bed of a transport vehicle 10 during loading and unloading operations as illustrated in FIG. 1 and then is lowered into a pendant position for storage and retained by the lip keepers 25.

Any load on the dock leveler is transferred to the frame assembly 20 through the deck hinge pin 32 and to the bed of the vehicle 10 through the front end of the lip 41. The distance from the lip hinge pin 39 to the front end of the lip resting on the bed of the vehicle 10 is typically 15 to 20 inches while the distance from the hinge pin to the rear edge where it contacts the deck is typically 2 inches or less. Thus, the increased leverage will generate forces on the lip hinge pin 39 and hinge tubes 42 which may be more than 10 times greater than the force applied upward at the front end of the lip 41.

Figure 2:
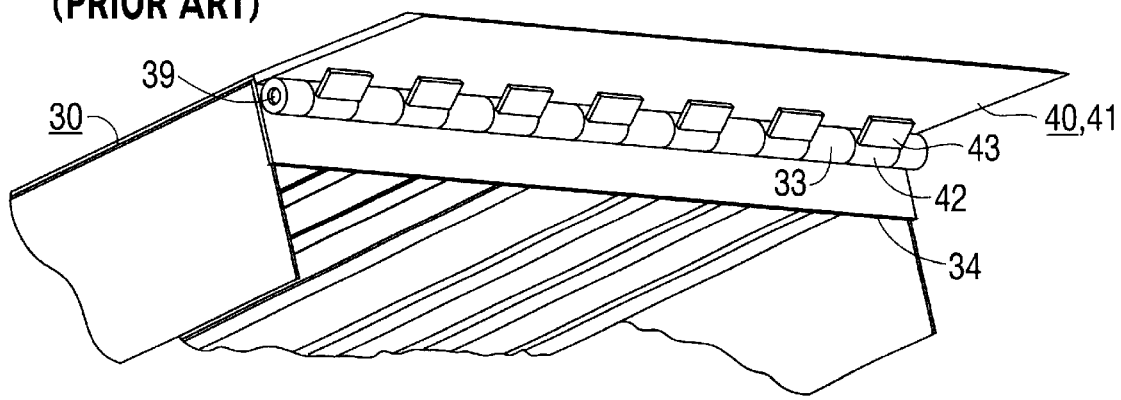
FIG. 2 is a perspective view of a prior art deck assembly with hinge tube lip assembly, illustrating the hinge tube and conventional gusset configuration.
Figure 4:
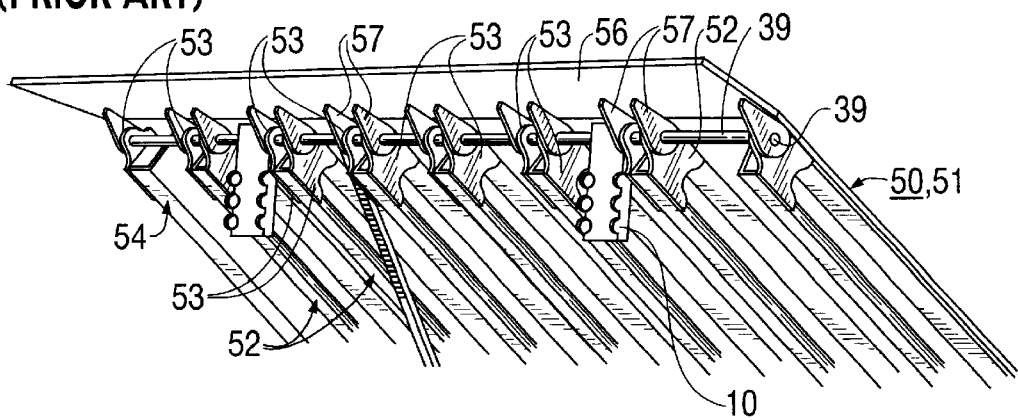
FIG. 4 is a perspective view of a prior art lug hinge configuration.
Figure 5:
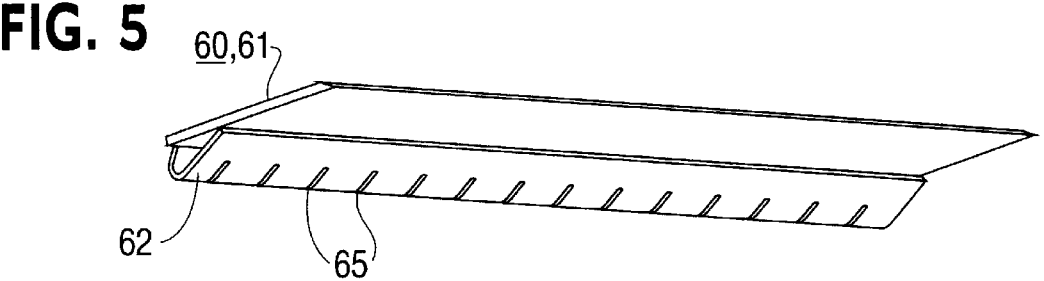
FIG. 5 is a perspective view of the lip assembly with formed hinge of the first preferred embodiment of this invention.

FIG. 2 illustrates the construction of a conventional lip assembly with a lip plate 41, a number of hinge tubes 42 which fit between a number of similar hinge tubes 33 welded the front header 34 of the deck assembly 20 shown in FIG. 4. The gussets 43 may be optionally added to reduce the bending stress in the lip.

While this construction is adequate for many dock leveler applications, it is prone to fatigue failure at the welded joints when subjected to repeated high loads. Typically failure will occur at the welds and often begins at the ends of the welds where stress is increased by the abrupt change in thickness.

Figure 3:
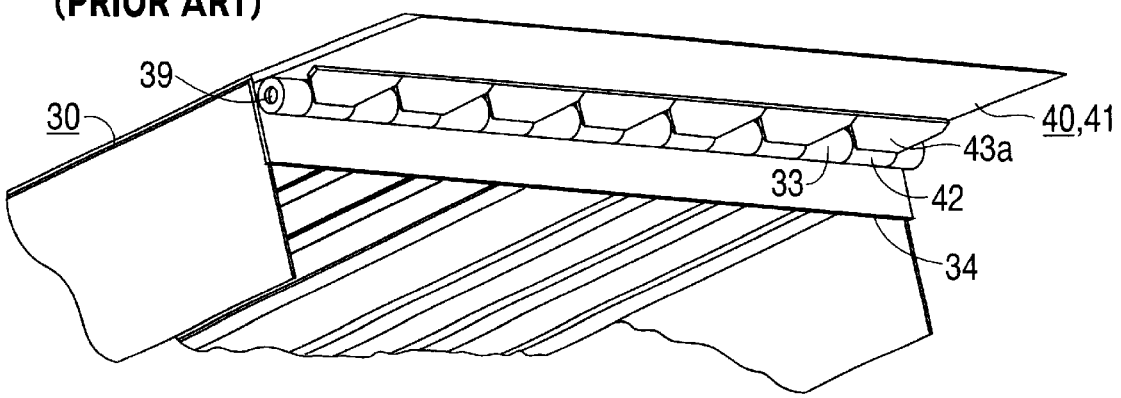
FIG. 3 is a perspective view of a prior art improved lip assembly configuration with hinge tubes and a continuous gusset.

FIG. 3 illustrates the construction of an improved lip assembly as described in U.S. Pat. No. 5,071,306. Each gusset 43a is outwardly tapered as shown and is welded to the hinge tube 42 on two surfaces. This method of construction allows the total length of weld between the gusset 43a and hinge tube 42 to be twice that of the conventional construction shown in FIG. 2.

FIG. 4 illustrates the construction of a lug style lip assembly as described in U.S. Pat. No. 4,068,338. The deck assembly 50 has a deck plate 51 and a number of beams 52. Lugs 53 are welded to the beams and deck plate and a similar number of lugs 57 are welded to the lip plate 56. This construction allows the hinge pin 39 to be placed a greater distance from the lip and reduces the forces on the hinge. However the lip is still prone to fatigue failure at the front tips of the lugs 57.

FIGS. 5 to 8 illustrate the construction of the improved lip assembly in accordance with a first preferred embodiment of this invention. As shown on FIG. 5 the lip assembly 60 has a lip plate 61 and a unitary hinge 62 that is formed from a flat plate, bent to shape and formed with a plurality of slotted openings 65 cut in the rear edge. Both front and rear edges of the hinge 62 are welded to the lip 61. The continuous weld at the front edge of the hinge provides the greatest resistance to fatigue failure where the lip withstands the highest bending stress.

Figure 6:
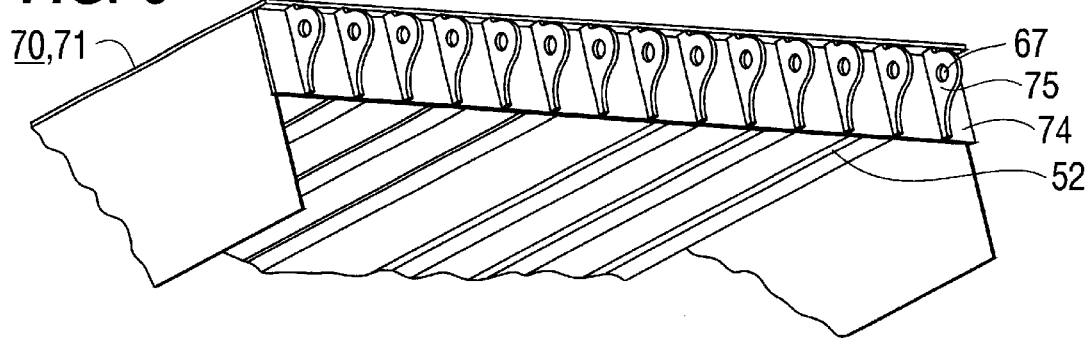
FIG. 6 is a perspective view of the deck assembly with hinge lugs of the first preferred embodiment of this invention.

FIG. 6 illustrates a deck assembly 70 with conventional deck plate 71 and front header bar 74 made in accordance with this invention. The front header bar 74 is recessed from the front of the deck plate 71 and a plurality of hinge lugs 75 are welded to the front header bar 74 deck and the deck plate 71. It will be appreciated that the spacing of the hinge lugs 75 corresponds to the spacing of the slots 65.

While FIG. 6 illustrates the hinge lugs 75 attached to the front of the header bar 74, they may also be attached directly to the deck beams 52. In that instance the header bar 74 may be eliminated.

Figure 7:
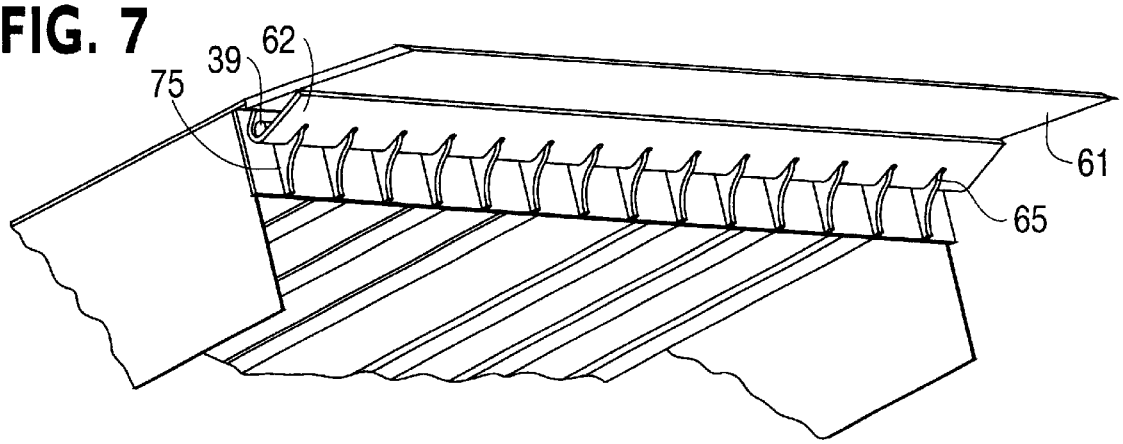
FIG. 7 is a perspective view of the combined deck and lip assemblies of the first preferred embodiment of this invention.

FIG. 7 illustrates the lip assembly 60 attached to the deck assembly 70 with the lugs 75 engaging the slotted openings 65 in the lip hinge 62. A hinge pin 39 secures the lip assembly to the deck assembly by extending through the holes 67 in each lug 75.

Figure 8:
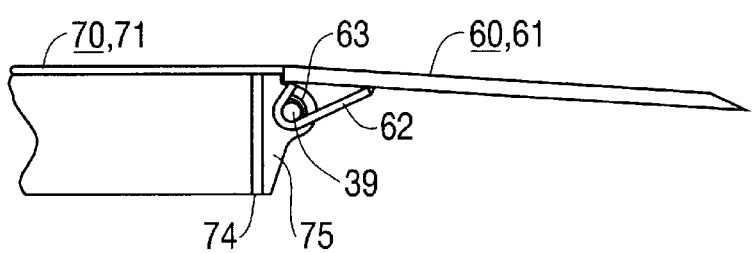
FIG. 8 is a side view of the formed lip hinge of the first preferred embodiment of this invention.

FIG. 8 illustrates a side view of the assembly. Two or more brackets 63 are welded inside the lip hinge 62 to form the front bearing surface of the hinge. These parts do not contribute to the strength of the hinge but hold the lip assembly in the proper position relative to the hinge pin 39. The brackets 63 also carry the weight of the leveler when the lip is resting in the lip keepers.

Figure 9:
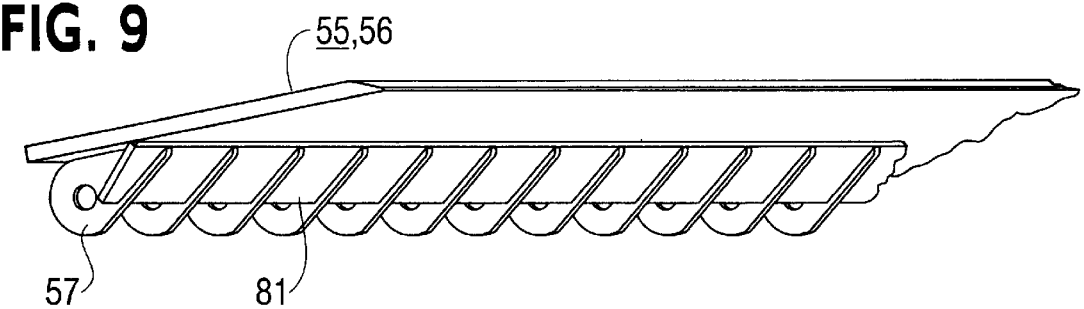
FIG. 9 is a perspective view of the lip assembly with lug hinges and multiple gusset plates of the second preferred embodiment of this invention.
Figure 10:
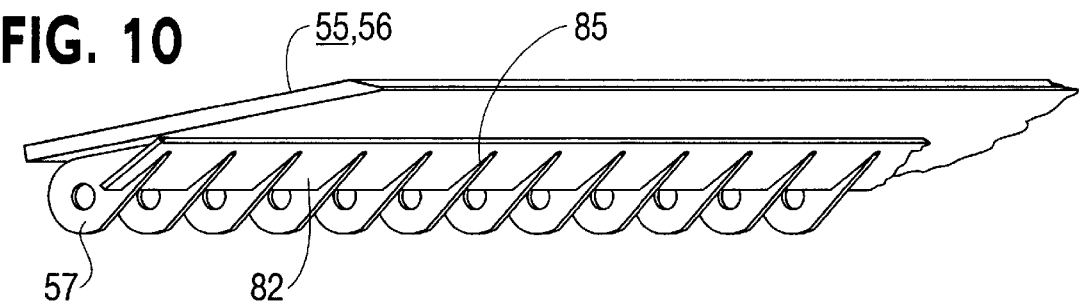
FIG. 10 is a perspective view of the lip assembly with lug hinges and single gusset plate of the second preferred embodiment of this invention.
Figure 11:
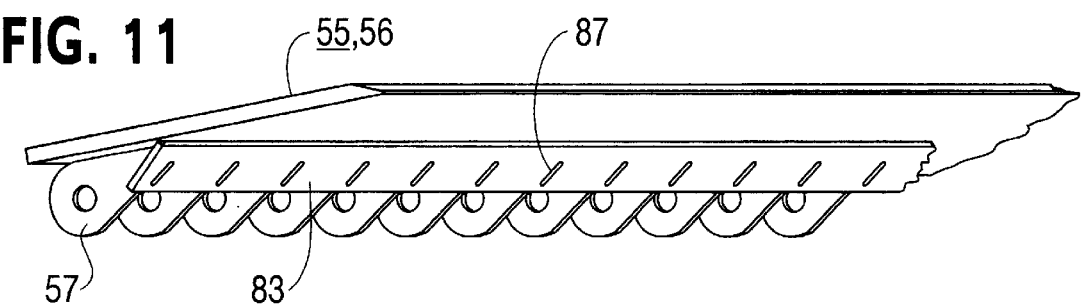
FIG. 11 is a perspective view of the lip assembly with lug hinges and single gusset plate of the second preferred embodiment of this invention.

FIGS. 9, 10 and 11 illustrate the construction of the improved lip assembly 55 in accordance with a second preferred embodiment of this invention. The lug hinge construction shown in FIG. 4 is modified by the addition of a full width plate gusset 81 that allows a continuous weld to the lip to provide greater resistance to fatigue failure. The gusset may be a series of plates 81 welded between the lip hinge lugs 57 as shown in FIG. 9. It may also be a plate 82 having a series of notches 85 through which the lugs 57 project, as shown in FIG. 10. It may also be a single plate 83 having a series of slots 87 for plug welding to the lugs 57, as shown in FIG. 11.

It is apparent that modifications of this invention may be practiced without departing from this invention. For example while it is preferred that the weld extend substantially the length of the hinge plate, in some applications the weld can be discontinuous or terminate along intervals of the plate. Also, while the first preferred embodiment is the integral hinge formed by bending into a curved shape other arrangements may be used. For example, it could be formed with a plurality of bends of smaller radius to form a plurality of flat surfaces which are in contact with the hinge pin.

I claim:

1. A lip assembly for a dock leveler comprising:

a substantially flat plate forming a lip, an integral hinge extending for substantially the width of the lip, said integral hinge formed by shaping a plate into an arcuate configuration, said integral hinge welded to said lip along two edges of said hinge, a plurality of slots formed in said integral hinge, a deck for a dock leveler, a series of hinge lugs projecting outwardly from said deck, said hinge lugs spaced to fit individually into said slots formed in said integral hinge, and a hinge pin passing through each of said hinge lugs to secure said lip assembly to the front of said deck.

2. The lip assembly of claim 1 wherein said integral hinge has a series of slots formed in the arcuate portion thereof, said integral hinge having a flat portion with an edge confronting said flat plate forming said lip and a continuous weld extending substantially the length of said edge.

3. A lip assembly for a dock leveler comprising:

a substantially flat plate forming a lip, an integral hinge extending for substantially the width of the lip, said integral hinge formed by shaping a plate into an arcuate configuration, said integral hinge welded to said lip along two edges of said hinge, a plurality of slots formed in said integral hinge, wherein said slots comprise a series of spaced parallel openings extending across said integral hinge, a deck for a dock leveler, a header plate attached to the front of the deck, a series of hollow hinge lugs spaced in conformance with the spacing of said slots to fit individually into said slots, and a hinge pin passing through each of said hinge lugs to secure said lip assembly to the front of said deck.

4. The lip assembly of claim 3 wherein said integral hinge has a series of slots formed in the arcuate portion thereof, said integral hinge having a flat portion with an edge confronting said flat plate forming said lip and a continuous weld extending substantially the length of said edge.

5. A lip assembly for a dock leveler comprising:

a substantially flat plate forming a lip, a series of hinge lugs attached to one surface of said plate in a spaced arrangement, and an integral gusset extending for substantially the width of the lip, said integral gusset coupled to each hinge lug and welded to said lip along a continuous edge thereof, wherein said integral gusset is formed by a unitary plate notched to engage said hinge lugs.

6. A lip assembly for a dock leveler comprising:

a substantially flat plate forming a lip, a series of hinge lugs attached to one surface of said plate in a spaced arrangement, and an integral gusset extending for substantially the width of the lip, said integral gusset coupled to each hinge lug and welded to said lip along a continuous edge thereof, wherein said integral gusset comprises a unitary plate having a series of slots spaced to conform to the spacing of said hinge lugs, said plate welded to said hinge lugs through said slots.

* * * * *